United States Patent
Choi et al.

(10) Patent No.: US 11,392,265 B2
(45) Date of Patent: *Jul. 19, 2022

(54) METHOD FOR SELECTING AND CONTROLLING SECOND WORK PROCESS DURING FIRST WORK PROCESS IN MULTITASKING MOBILE TERMINAL

(71) Applicant: Pantech Corporation, Seoul (KR)

(72) Inventors: Seul Ki Choi, Ansan-si (KR); Sang Jin Yoon, Anyang-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/405,803

(22) Filed: May 7, 2019

(65) Prior Publication Data

US 2019/0265862 A1  Aug. 29, 2019

Related U.S. Application Data

(63) Continuation of application No. 15/436,299, filed on Feb. 17, 2017, now Pat. No. 10,282,054, which is a
(Continued)

(30) Foreign Application Priority Data

Aug. 11, 2005 (KR) .................. 10-2005-0073877
Oct. 28, 2005 (KR) .................. 10-2005-0102198

(51) Int. Cl.
*G06F 9/48* (2006.01)
*G06F 9/44* (2018.01)
(Continued)

(52) U.S. Cl.
CPC ........ *G06F 3/04817* (2013.01); *G06F 3/0346* (2013.01); *G06F 3/048* (2013.01);
(Continued)

(58) Field of Classification Search
CPC .... G06F 3/048; G06F 3/0481; G06F 3/04817; G06F 3/0482; G06F 9/48; G06F 9/4806;
(Continued)

(56) References Cited

U.S. PATENT DOCUMENTS 5,075,675 A   12/1991  Barker et al.
5,859,639 A   1/1999   Ebrahim
(Continued)

OTHER PUBLICATIONS

Nokia Corp., "User's Guide for Nokia 511 0", Copyright 2004, Nokia Mobile Phones, Finland.
(Continued)

*Primary Examiner* — Charles M Swift
(74) *Attorney, Agent, or Firm* — Capitol IP Law Group, PLLC

(57) ABSTRACT

Provided is a method for controlling a plurality of work processes in a multitasking mobile terminal, and more particularly, a method for selecting a second work process during a first work process and controlling a predetermined function of the selected second work process. In the controlling method, icons corresponding to the respective work processes are displayed in response to a user command, and a desired work process is selected through the displayed icons. A predetermined function of the selected work process is controlled through a pop-up menu activated in response to the user command.

18 Claims, 10 Drawing Sheets

Related U.S. Application Data continuation of application No. 15/010,629, filed on Jan. 29, 2016, now Pat. No. 9,575,631, which is a continuation of application No. 14/840,844, filed on Aug. 31, 2015, now Pat. No. 9,250,957, which is a continuation of application No. 11/495,863, filed on Jul. 28, 2006, now Pat. No. 9,122,518.

(51) Int. Cl.
| | |
|---|---|
| *G06F 3/048* | (2013.01) |
| *G06F 3/0482* | (2013.01) |
| *G06F 3/04817* | (2022.01) |
| *G06F 3/0481* | (2022.01) |
| *G06F 9/451* | (2018.01) |
| *G06F 3/0346* | (2013.01) |
| *G06F 3/04842* | (2022.01) |
| *G06F 3/16* | (2006.01) |
| *G06F 3/04812* | (2022.01) |

(52) U.S. Cl.
CPC .......... *G06F 3/0481* (2013.01); *G06F 3/0482* (2013.01); *G06F 3/04812* (2013.01); *G06F 3/04842* (2013.01); *G06F 3/162* (2013.01); *G06F 3/167* (2013.01); *G06F 9/451* (2018.02); *G06F 9/48* (2013.01); *G06F 9/485* (2013.01); *G06F 9/4806* (2013.01); *G06F 9/4843* (2013.01); *G06F 9/4881* (2013.01)

(58) Field of Classification Search
CPC ...... G06F 9/4843; G06F 9/485; G06F 9/4881; G06F 9/4443
USPC ........ 718/100, 102, 103; 715/700, 764, 778, 715/779, 781, 802, 804, 805, 808, 817, 715/828, 829, 846, 847, 864
See application file for complete search history.

(56) References Cited

U.S. PATENT DOCUMENTS

| | | | |
|---|---|---|---|
| 5,973,694 A * | 10/1999 | Steele | G06F 3/0481 434/116 |
| 6,388,686 B1 | 5/2002 | Hetherington et al. | |
| 6,546,263 B1 | 4/2003 | Peiiy et al. | |
| 7,123,945 B2 | 10/2006 | Kokubo | |
| 7,222,304 B2 | 5/2007 | Beaton et al. | |
| 7,487,460 B2 | 2/2009 | Benson | |
| 7,546,188 B2 | 6/2009 | Nezu et al. | |
| 7,623,119 B2 | 11/2009 | Autio et al. | |
| 8,106,877 B2 | 1/2012 | Park et al. | |
| 2002/0080186 A1 | 6/2002 | Frederiksen | |
| 2003/0011638 A1 | 1/2003 | Chung | |
| 2003/0013483 A1 | 1/2003 | Ausems et al. | |
| 2003/0016251 A1 | 1/2003 | Kondo | |
| 2003/0119562 A1* | 6/2003 | Kokubo | H04M 1/72583 455/566 |
| 2004/0061723 A1* | 4/2004 | Tai | G06F 9/451 715/779 |
| 2004/0229200 A1 | 11/2004 | McKeon et al. | |
| 2005/0086611 A1 | 4/2005 | Takabe et al. | |
| 2005/0120306 A1 | 6/2005 | Klassen et al. | |
| 2005/0183017 A1 | 8/2005 | Cain | |
| 2005/0229103 A1 | 10/2005 | King | |
| 2005/0257169 A1 | 11/2005 | Tu | |
| 2006/0075347 A1 | 4/2006 | Rehm | |
| 2006/0107227 A1 | 5/2006 | Kiljander | |
| 2006/0236266 A1 | 10/2006 | Majava | |
| 2006/0247851 A1 | 11/2006 | Morris | |
| 2007/0003224 A1 | 1/2007 | Krikorian et al. | |
| 2007/0192741 A1 | 8/2007 | Yoritate et al. | |

OTHER PUBLICATIONS

Non-Final Office Action dated Aug. 31, 2010, in U.S. Appl. No. 11/495,683.
Final Office Action dated Mar. 16, 2011, in U.S. Appl. No. 11/495,683.
Non-Final Office Action dated Oct. 22, 2012, in U.S. Appl. No. 11/495,683.
Finai Office Action dated Mar. 28, 2013, in U.S. Appl. No. 11/495,683.
Non-Final Office Action dated Jul. 10, 2013, in U.S. Appl. No. 11/495,683.
Final Office Action dated Dec. 4, 2013, in U.S. Appl. No. 11/495,683.
Non-Final Office Action dated Sep. 23, 2014, in U.S. Appl. No. 11/495,683.
Notice of Allowance dated Apr. 22, 2015, in U.S. Appl. No. 11/495,683.
Notice of Allowance dated Sep. 25, 2015, in U.S. Appl. No. 14/840,844.
Non-Final Office Action dated May 19, 2016 in U.S. Appl. No. 15/010,629.
Notice of Allowance dated Oct. 7, 2016, in U.S. Appl. No. 15/010,629.

* cited by examiner

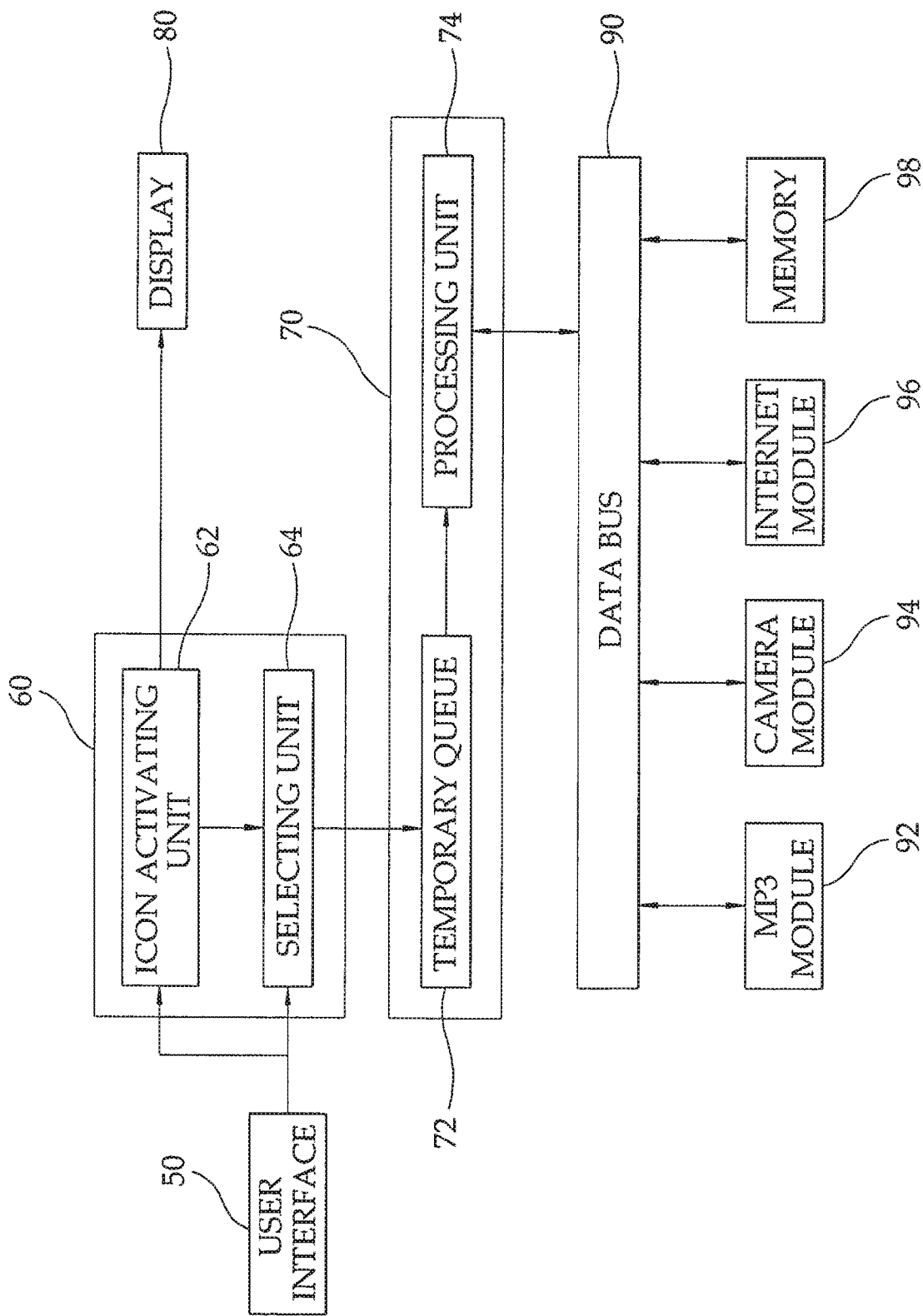

METHOD FOR SELECTING AND CONTROLLING SECOND WORK PROCESS DURING FIRST WORK PROCESS IN MULTITASKING MOBILE TERMINAL

CROSS-REFERENCE TO RELATED PATENT APPLICATIONS

This application is a Continuation of U.S. patent application Ser. No. 15/436,299, filed on Feb. 17, 2017, which is a Continuation of U.S. patent application Ser. No. 15/010,629, filed on Jan. 29, 2016, which is a Continuation of U.S. patent application Ser. No. 14/840,844, filed on Aug. 31, 2015, now issued as U.S. Pat. No. 9,250,957, which is a Continuation of U.S. patent application Ser. No. 11/495,863, filed on Jul. 28, 2006, now U.S. Pat. No. 9,122,518, and claims priority from and the benefit of Korean Patent Application No. 10-2005-0073877 filed on Aug. 11, 2005, and Korean Patent Application No. 10-2005-0102198 filed on Oct. 28, 2005, each of which is hereby incorporated by reference for all purpose as if fully set forth herein.

BACKGROUND

Field

The present invention relates to a method for controlling a plurality of work processes in a multitasking mobile terminal, and more particularly, to a method for selecting a second work process during a first work process and controlling a predetermined function of the selected second work process.

Discussion of the Background

With the recent advance of mobile communication technology, various kinds of mobile terminals such as hand-held phones and personal digital assistants • (PDAs) are commercially available. The mobile terminals have a wireless communication function, a camera function, a multimedia play function, an Internet connection function, and the like. Also, as the performance of microprocessors built in the mobile terminals is improved, a plurality of work processes can be performed concurrently. For example, an MP3 music file can be played during a phone call, or a short message service (SMS) message can be sent while an MP3 music file is played.

FIG. 1 is a functional block diagram of a conventional multitasking mobile terminal that concurrently performs a plurality of work processes. A mobile chipset 1 controls an overall operation of the mobile terminal according to user commands. The mobile chipset 1 transmits a control signal through a data bus 3 to a camera module 5, an MP3 module 7, and an Internet module 9 according to the user commands. Work processes of the camera module 5, the MP3 module 7, and the Internet module 9 are concurrently performed according to the control signal.

FIG. 2 is a flowchart illustrating a conventional method for selecting a second work process during a first work process in a multitasking mobile terminal that concurrently performs a plurality of work processes. In step S10, while a first work process is performed, a user command for a second work process is inputted. In step S12, a menu window for selecting a new work process is displayed on a display of the mobile terminal in response to the user command. In step S14, the user selects a desired new work process through the displayed menu window. In steps S16 and S17, when the user wants to change the selected process into another new process, the selected work process is terminated. In step S18, a user command for selecting the another new work process is inputted. In step S19, the another new work process is selected through the displayed menu window in response to the user command.

FIG. 3 is a flowchart chart illustrating a conventional method for controlling a predetermined function of a second work process during a first work process in a multitasking mobile terminal that concurrently performs a plurality of work processes.

In step S20, assuming that the first work process is an MP3 play process and the second work process is an SMS message creation process, a first command of user for the SMS message creation process is inputted while an MP3 music file is played. In step S21, a screen for the SMS message creation process is displayed in response to the first command of user, and the SMS message creation process is performed while the MP3 music file is played. In step S23, it is determined whether or not a second command of user for controlling a function of the MP3 play process is inputted while an SMS message is created. In steps S25 and S27, when the second command of user is inputted, the SMS message that is being created is stored in the memory and the SMS message creation process is terminated. In step S29, after the termination of SMS message creation process, the function of the MP3 play process is controlled. When the SMS message creation process is terminated, a screen for the MP3 play process is again displayed, and a third command of user for controlling the function of the MP3 play process is inputted. A control signal corresponding to the third command of user is generated and the function of the MP3 play process is controlled.

SUMMARY

In the conventional method for selecting the work process, when selecting a wok process that is concurrently performed, the user has to select a new work process through a displayed menu window. Also, in order to terminate a predetermined work process among a plurality of work processes that are concurrently performed and select a new work process, the user has to select the new work process through the menu window.

Also, in the conventional method for controlling a function of the work process, the user has to terminate an SMS message creation process so as to control a function of an MP3 play process (e.g., volume control, list selection of MP3 music files) while creating an SMS message. In case where the SMS message creation process is terminated, the SMS message that is being created is deleted or stored in a predetermined memory space such as a temporary mailbox. Consequently, the conventional method is inconvenient in that the user has to again select the SMS message creation process and create the SMS message or reload the SMS message stored in the temporary mailbox.

The present invention provides a method for selecting a work process of a multitasking mobile terminal through an icon corresponding to the work process.

The present invention also provides a method for controlling a function of a work process through an activated pop-up menu in a multitasking mobile terminal that concurrently performs a plurality of work processes.

According to an aspect of the present invention, there is provided a method for selecting a second work process during a first work process in a multitasking mobile terminal that concurrently performs the first work process and the second work process. The selecting method includes: inputting a user command for selecting the second work process; and displaying an icon corresponding to the second work process in response to the user command, and selecting the second work process based on the displayed icon.

According to another aspect of the present invention, there is provided a method for controlling a predetermined function of a second work process during a first work process in a multitasking mobile terminal that concurrently performs the first work process and the second work process. The controlling method includes: inputting a first command of user for selecting a predetermined function of the second work process; activating a pop-up menu for controlling the predetermined function of the second work process in response to the first command of user; and controlling the predetermined function of the second work process through the activated pop-up menu.

BRIEF DESCRIPTION OF THE DRAWINGS

The above and other features and advantages of the present invention will become more apparent by describing in detail exemplary embodiments thereof with reference to the attached drawings in which:

FIG. 6 is a functional block diagram of an apparatus for selecting a work process of a multitasking mobile terminal that concurrently performs a first work process and a second work process according to an embodiment of the present invention;

DETAILED DESCRIPTION OF THE ILLUSTRATED EMBODIMENTS

Hereinafter, a method for selecting a second work process during a first work process and controlling a function of the selected second work process according to the present invention will be described in detail with reference to the accompanying drawings.

Figure 1:
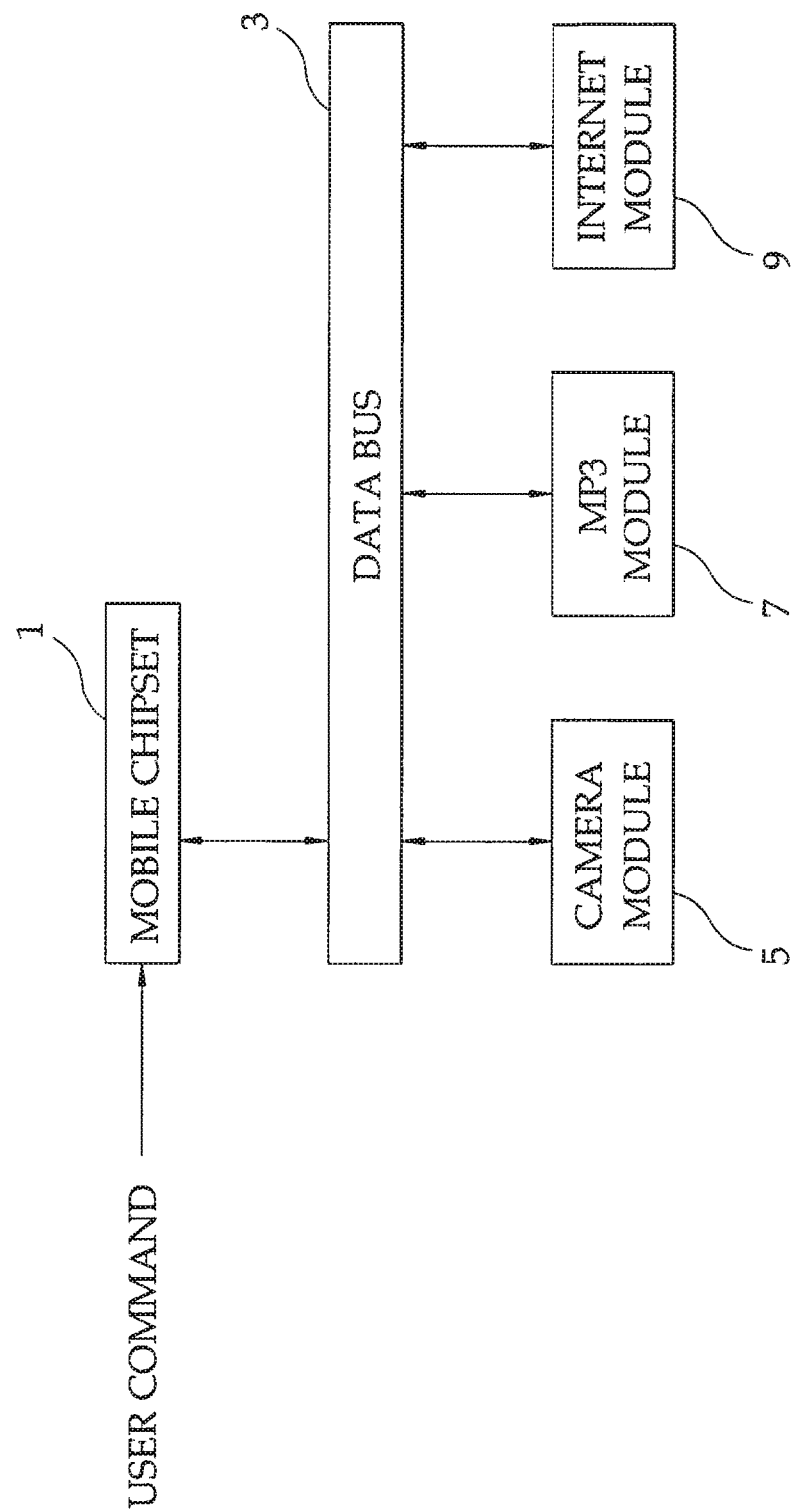
FIG. 1 is a functional block diagram of a conventional multitasking mobile terminal that concurrently performs a plurality of work processes.
Figure 2:
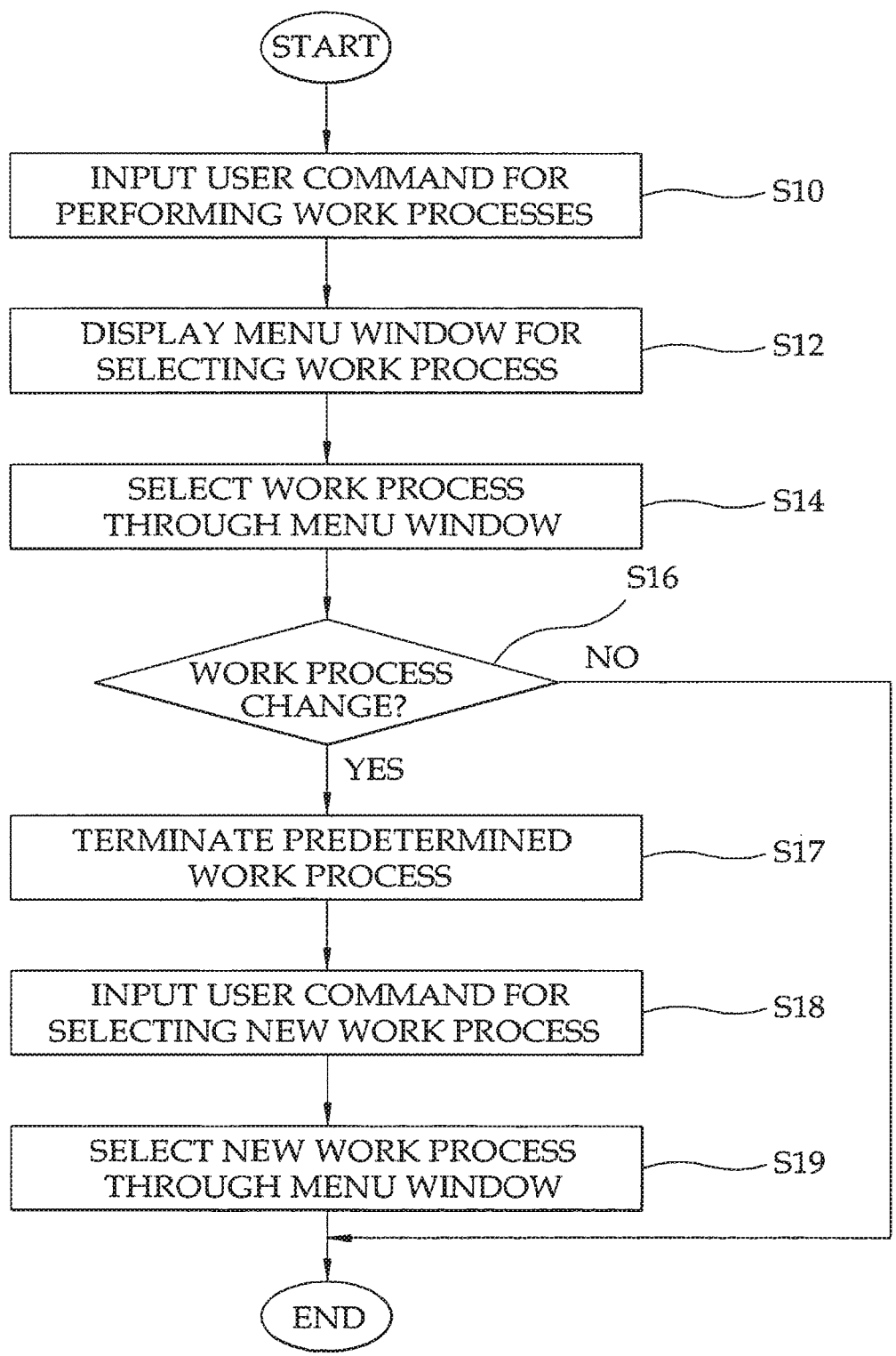
FIG. 2 is a flowchart illustrating a conventional method for selecting a second work process during a first work process in a multitasking mobile terminal that concurrently performs a plurality of work processes.
Figure 3:
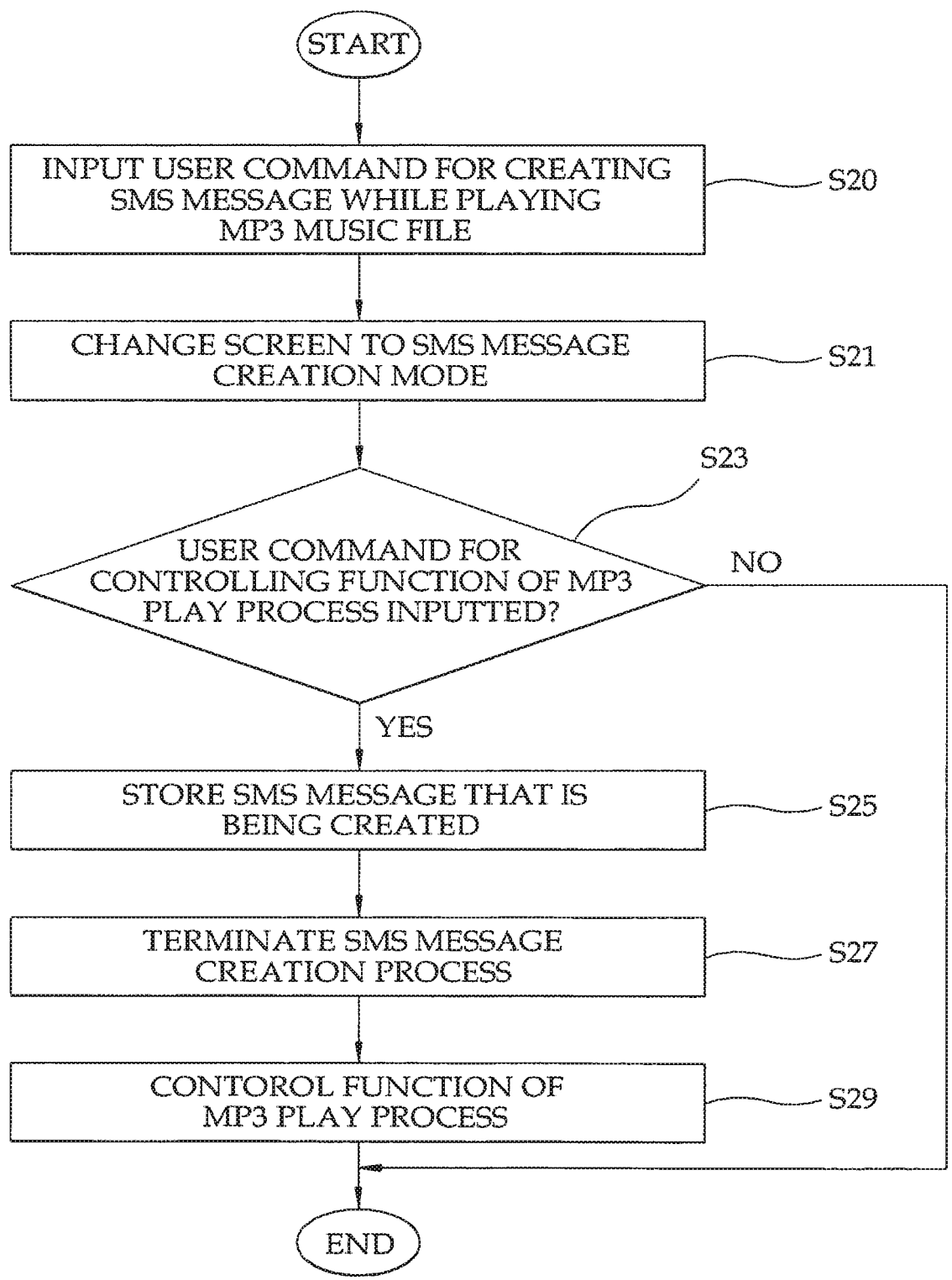
FIG. 3 is a flowchart illustrating a conventional method for controlling a function of a second work process during a first work process in a multitasking mobile terminal that concurrently performs a plurality of work processes.
Figure 4:
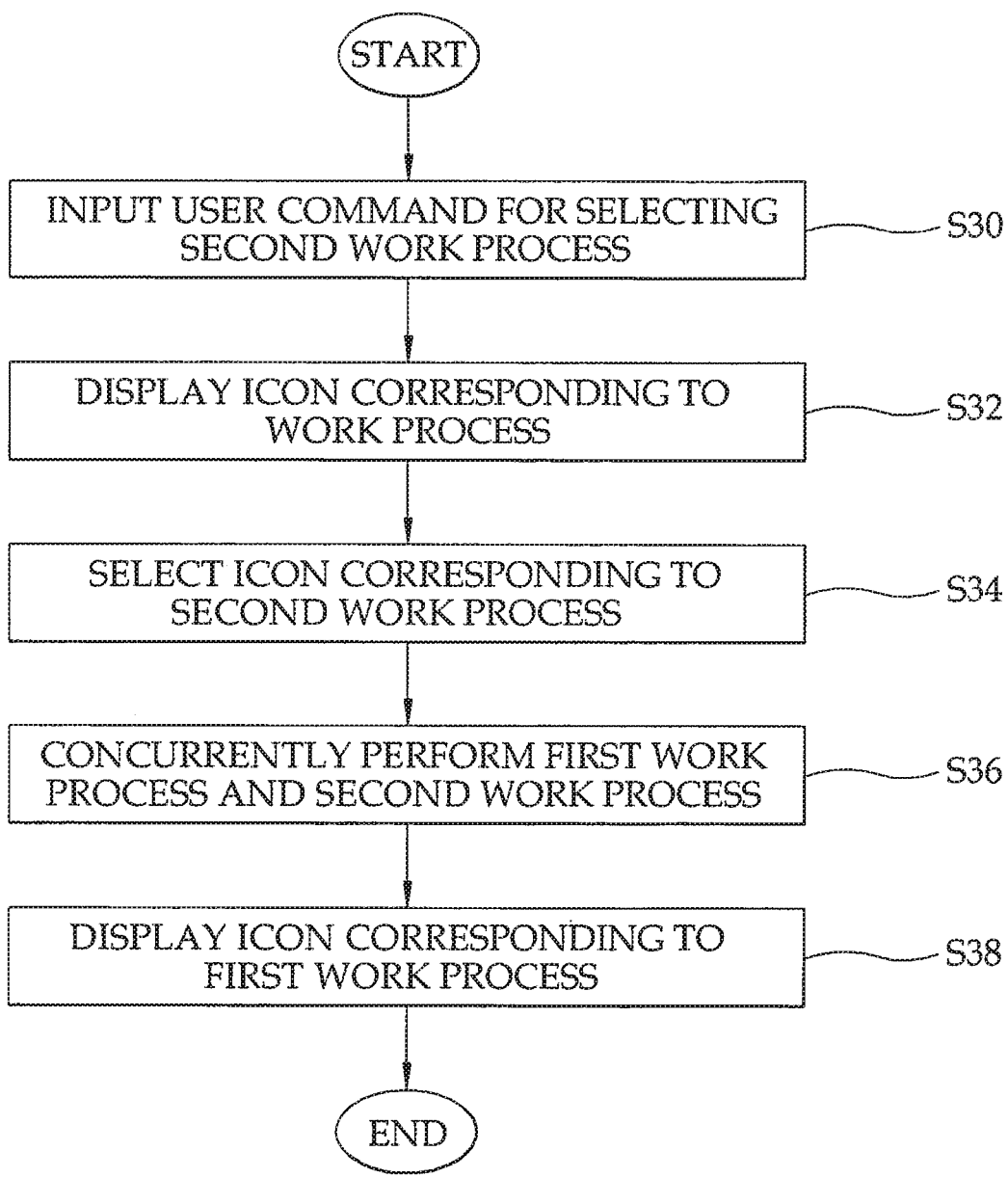
FIG. 4 is a flowchart illustrating a method for selecting a second work process in a multitasking mobile terminal that concurrently performs a first work process and the second work process.

FIG. 4 is a flowchart illustrating a method for selecting a second work process in a multitasking mobile terminal that concurrently performs a first work process and the second work process according to an embodiment of the present invention. Referring to FIG. 4, in step S30, a user command for selecting the second work process is inputted. In step S32, while the first work is processed through the first work process of the mobile terminal, a first command of user for multitasking of the second work process together with the first work is inputted. Icons corresponding to the work processes are displayed in response to the first user command. The icons are previously designated with respect to all work processes of the mobile terminal. Every when the first command of user is inputted, the icons are displayed in turn.

In step S34, when an icon corresponding to the second work process the user wants to select is displayed, a second command of user for selecting the displayed icon is inputted. In step S36, the first work of the first work process and the second work of the second work process are concurrently processed in response to the second command of user. For example, when the user intends to send an SMS message while an MP3 music file is played, an MP3 play process and an SMS message send process are divided in quantum units and alternately processed at regular time intervals.

In step S38, an icon corresponding to the first work process is preferably displayed together with an activated screen image of the second work process. The user can know from the displayed icon that the first work process is concurrently performed in the second work process.

FIG. 5A, FIG. 5B, FIG. 5C, and FIG. 5D illustrate the displayed icons of the work processes according to an embodiment of the present invention.

Figure 5A:
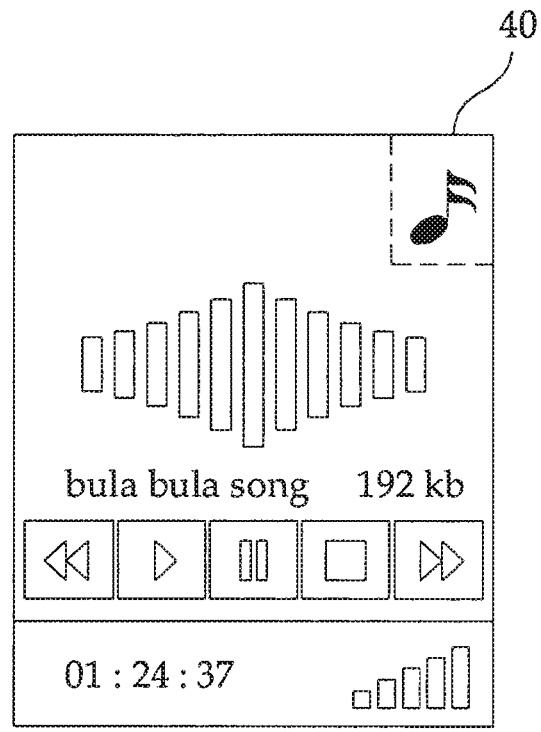
FIGS. 5A, 5B, 5C, and 5D illustrate the displayed icons of the work processes according to an embodiment of the present invention.

Referring to FIG. 5A, an icon indicating an MP3 play process is displayed in a first portion of a display 40, while an MP3 music file is played.

Figure 5B:
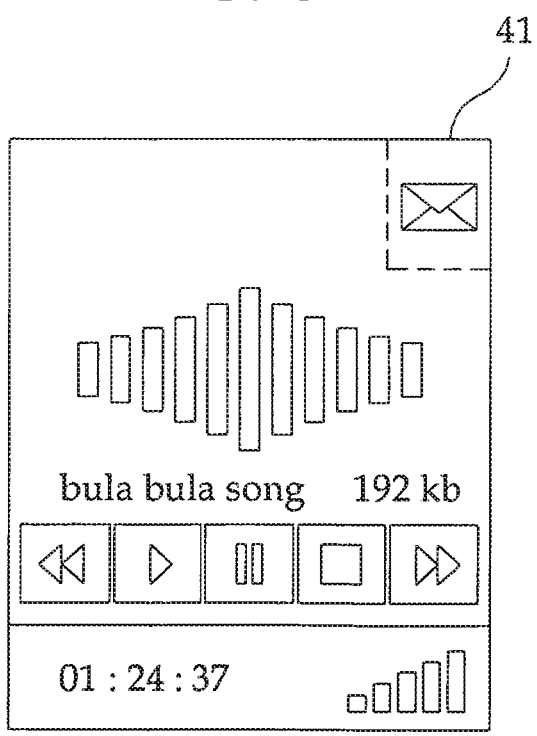

Referring to FIG. 5B, when a first command of user for sending an SMS message is inputted while an MP3 music file is played, an icon indicating an SMS message creation process is displayed in a first portion of a display 41.

Figure 5C:

Referring to FIG. 5C, when a second command of user for selecting a displayed SMS icon is inputted, an SMS message creation process is activated, and an MP3 play process and the SMS message creation process are performed concurrently. Preferably, an icon corresponding to the MP3 play process that is performed concurrently is displayed in a first portion of a display 42 together with a screen of the SMS message creation process.

Figure 5D:

Referring to FIG. 5D, when a first command of user for selecting a new work process of a camera mode is inputted, an icon corresponding to a camera mode work process is displayed in a first portion of a display 43 in response to the first user command. By selecting the displayed camera mode icon, the work process for sending an SMS message is changed to the camera mode work process.

FIG. 6 is a functional block diagram of an apparatus for selecting the work process of the multitasking mobile terminal that concurrently performs the first work process and the second work process. Referring to FIG. 6, the apparatus according to the present invention includes a user interface 50, a second work process selecting unit 60, a multiprocessing unit 70, a .display 80, a data bus 90, and a plurality of application units 92, 94 and 96. The plurality of application units 92, 94 and 96 are controlled via the data bus 90 by the multiprocessing unit 70.

A user commands for changing the work process of the mobile terminal is inputted through the user interface 50. The user interface 50 may be a voice recognition unit for recognizing user's voice, or a motion recognition unit for recognizing a motion of the mobile terminal.

A first command of user for selecting the second work process that is concurrently performed together with the first work process of the mobile terminal is inputted through the user interface 50 to the second work process selecting unit 60. The second work process selecting unit 60 includes an icon activating unit 62 and a selecting unit 64. Every when the first command of user is inputted, the icon activating unit 62 sequentially displays icons corresponding to the respective work processes of the mobile terminal through the display 80. A second command of user is inputted through the user interface 50 to the selecting unit 64 so as to select the second work process concurrently performed together with the first work process among the sequentially displayed icons. The selecting unit 64 provides the work process corresponding to the selected icon to the multiprocessing unit 70 in response to the second user command.

The multiprocessing unit 70 includes a temporary queue 72 and a processing unit 74. The temporary queue 72 stores the first work process and the second work process, which are provided from the selecting unit 64 and performed concurrently. The processing unit 74 generates a control signal for alternately performing the first work process and the second work process, which are stored in the temporary queue 72, at regular time intervals. The processing unit 74 is connected through the data bus 90 to the MP3 module 92, the camera module 94, and the Internet module 96. The MP3 module 92, the camera module 94, and the Internet module 96 perform a work process of an MP3 play mode, a work process of a camera mode, and a work process of an Internet connection mode in response to the control signal outputted from the processing unit 74, respectively. Other applications can be further added to the mobile terminal according to the fields to which the present invention is applied. It is apparent to those skilled in the art that these embodiments will fall within the scope of the present invention.

Figure 7:
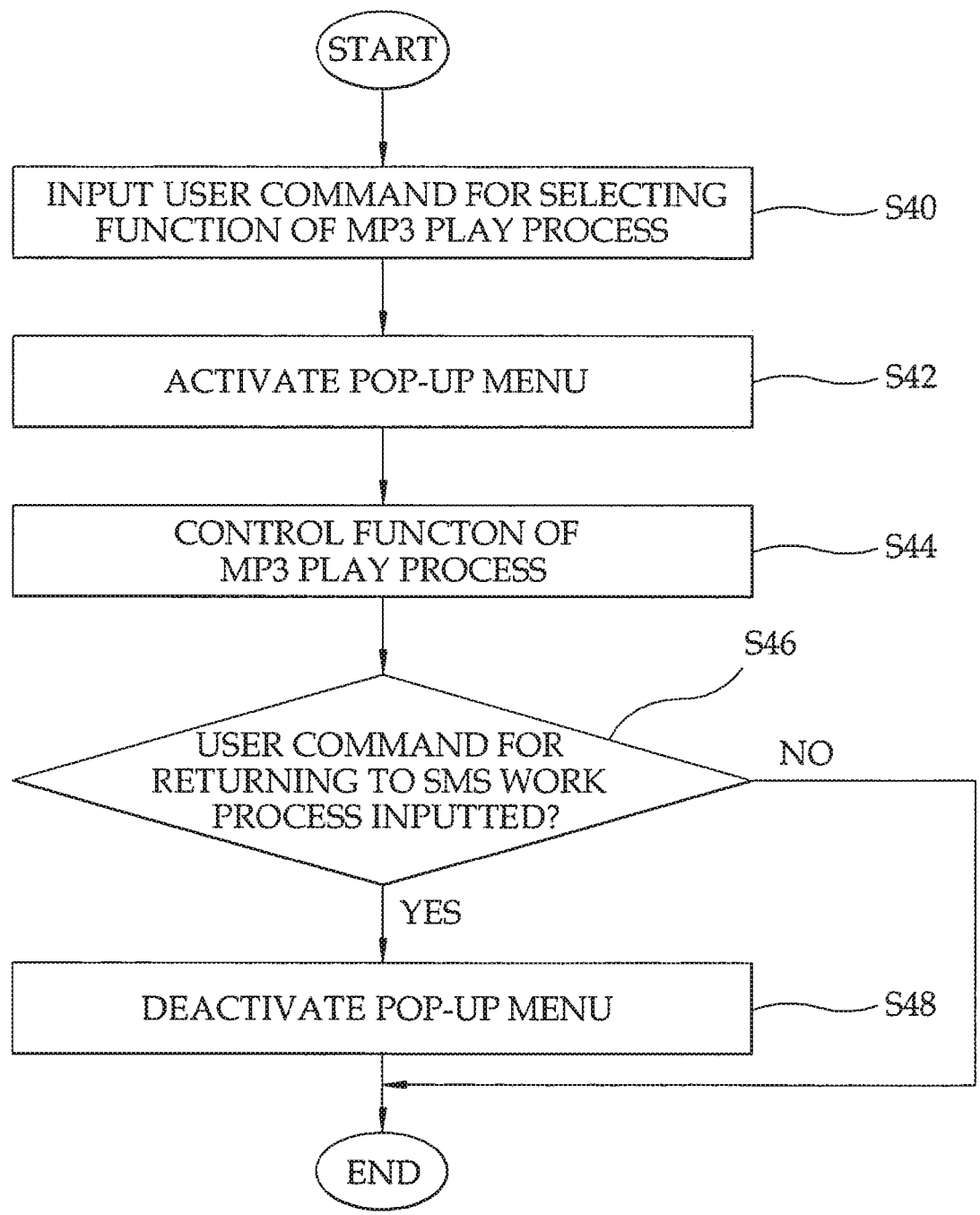
FIG. 7 is a flowchart illustrating a method for controlling a function of an MP3 play process during the creation of an SMS message in a multitasking mobile terminal that concurrently performs the MP3 play process and the SMS message creation process.

FIG. 7 is a flowchart illustrating a method for controlling a function of the MP3 play process, while the SMS message is created, according to an embodiment of the present invention.

Referring to FIG. 7, in step S40, a first command of user is inputted so as to control the function of the MP3 play process while the SMS message is created. In step S42, a pop-up menu for controlling the function of the MP3 play process is activated in the display of the mobile terminal in response to the first command of user.

In step S44, when the pop-up menu is activated, a second command of user is inputted for controlling the function of the MP3 play process, and the function of the MP3 play process is controlled in response to the second command of user. When the pop-up menu is activated, a pop-up process for controlling the function of the MP3 play process is assigned to a temporary queue by using the activated pop-up menu, and the pop-up process is concurrently performed together with the creation of the SMS message.

That is, the pop-up process and the SMS message creation process are divided in quantum units, and the pop-up process and the SMS message send process are alternately performed at regular time intervals. When the second command of user is inputted, the pop-up process generates the control signal corresponding to the second command of user and provides the generated control signal to the MP3 play process. The MP3 play process controls the function of the MP3 play process in response to the control signal.

In step S46, it is determined whether or not a third command of user for returning to the SMS message creation process is inputted. In step S48, when the third command of user is inputted after the control of the function of the MP3 play process is completed, the activated pop-up menu is deactivated. Even though the pop-up menu is deleted from the temporary queue and the pop-up process is terminated, the MP3 play process and the SMS message creation process continue to be performed and the user can keep on creating the SMS message while listening to the MP3 music.

Preferably, the first to third commands of user may be inputted through a predetermined key arranged at a keypad of the mobile terminal, a user's voice, a motion of the mobile terminal, and the like.

Preferably, the first and third commands of user may be inputted through the identical key of the mobile terminal.

Figure 8A:
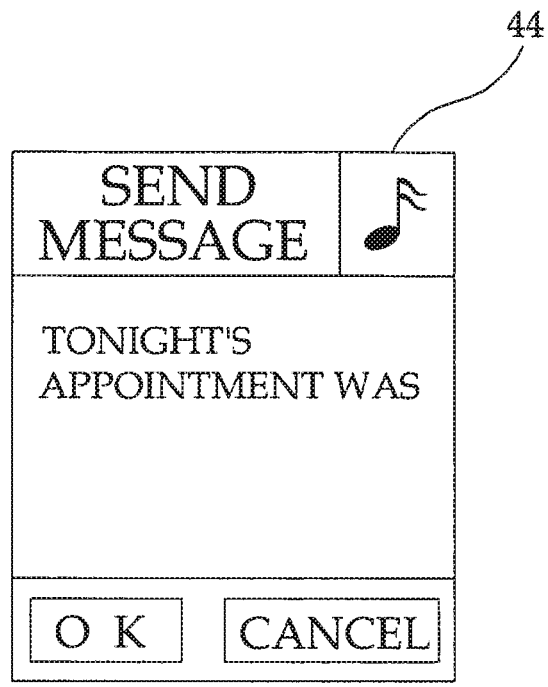
FIGS. 8A and 8B illustrate the displayed pop-up menus according to an embodiment of the present invention.
Figure 8B:
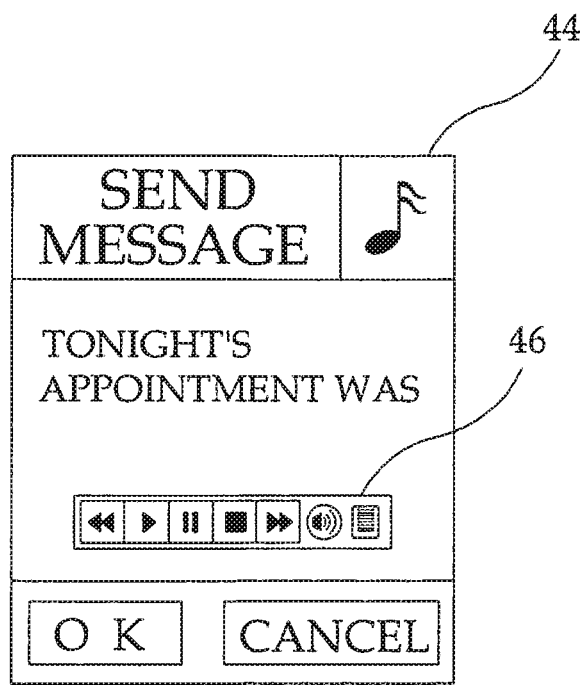

FIG. 8A and FIG. 8B illustrate the displayed pop-up menus according to an embodiment of the present invention.

FIG. 8A illustrates a pop-up menu displayed when the MP3 play process and the SMS message creation process are concurrently performed. Preferably, an icon 44 indicating the MP3 play process concurrently performed together with the SMS message creation process is also displayed in a portion of a display.

FIG. 8B illustrates a pop-up menu displayed in response to the first command of user. The pop-up menu 46 has a predetermined format, and image information for the pop-up menu 46 displayed is stored in the memory of the mobile terminal. Preferably, in response to the first command of user, the pop-up menu 46 may be displayed brightly and clearly, while the screen corresponding to the SMS message process may be displayed darkly and unclearly.

Figure 9:
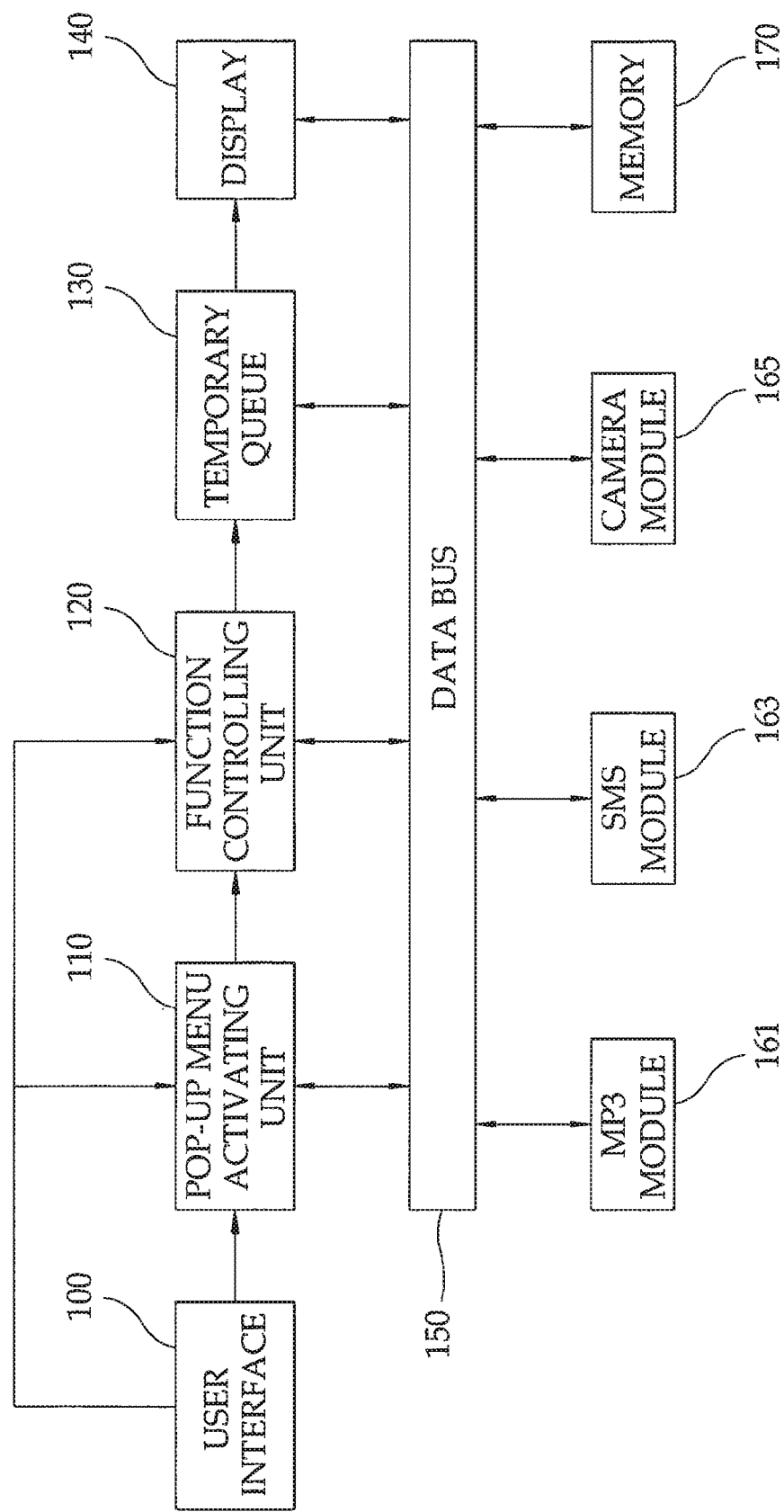
FIG. 9 is a functional block diagram of an apparatus for controlling a function of the MP3 play process in the multitasking mobile terminal that concurrently performs the MP3 play process and the SMS message creation process according to an embodiment of the present invention.

FIG. 9 is a functional block diagram of an apparatus for controlling the function of the MP3 play process in the multitasking mobile terminal that concurrently performs the MP3 play process and the SMS message creation process according to an embodiment of the present invention. Referring to FIG. 9, the apparatus according to the present invention includes a user interface 100, a pop-up menu activating unit 110, a function controlling unit 120, a temporary queue 130, a display 140, a data bus 150, a plurality of application modules 161, 163 and 165, and a memory 170.

A first command of user is inputted through the user interface 100. The pop-up menu activating unit 110 acquires image information of a pop-up menu stored in the memory 170 in a predetermined format through the data bus 150, and activates the pop-up menu on the display 140. Meanwhile, the temporary queue 130 stores a pop-up process.

A second command of user for controlling the function of the MP3 play process is inputted through the user interface 100, and the function controlling unit 120 generates a first control signal for controlling the pop-up menu in response to the second command of user. The MP3 play process, the SMS message creation process, and the pop-up process, which are stored in the temporary queue 130, are alternately performed at regular time intervals. The generated first control signal is transferred through the data bus 150 to the MP3 module, and the function of the MP3 play process is controlled.

A third command of user for terminating the pop-up process is inputted through the user interface 100. The function controlling unit 120 generates a second control signal for deactivating the pop-up menu in response to the third command of user. The generated second control signal is transferred through the data bus 150 to the temporary queue 130. The temporary queue 130 deletes the pop-up process in response to the second control signal, thus terminating the pop-up process.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks), optical recording media (e.g., CD-ROMs, or DVDs), and storage media such as carrier waves (e.g., transmission through the Internet).

The above-mentioned method for selecting the second work process according to the present invention can simply select the second work process by selecting the icons sequentially displayed while the first work process is performed.

Also, the above-described method for controlling the function of the second work process according to the present invention can simply control the function of the MP3 play process during the creation of the SMS message by controlling the function of the MP3 play process through the pop-up menu in the multitasking mobile terminal that concurrently performs the MP3 play process and the SMS message creation process.

Further, the above-described method for controlling the function of the second work process according to the present invention can continuously create the SMS message after controlling the function of the MP3 play process by controlling the function of the MP3 play process through the pop-up menu in the multitasking mobile terminal that concurrently the MP3 play process and the SMS message creation process.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method for selecting one or more work processes including selecting a second work process during a first work process in a multitasking mobile terminal that concurrently performs the first work process and the second work process, the method comprising:
    receiving a first user command on a user interface of the mobile terminal;
    displaying a plurality of icons of a predetermined uniform size, the plurality of icons including:
        a first icon corresponding to the first work process, wherein the first icon is displayed in response to the first user command;
        a second icon corresponding to the second work process; and
        a third icon corresponding to a third work process,
    wherein the first work process corresponds to an audio player function, the second work process corresponds to a short message service function, and the third work process corresponds to a camera mode function;
    receiving a second user command selecting the first icon on the user interface of the mobile terminal;
    performing the first work process based on the second user command, wherein performing the first work process incudes playing music using the audio player function and displaying an audio player user interface having a name of the music being played and a plurality of user selectable options for controlling playing of the music;
    receiving a third user command selecting the second icon on the user interface of the mobile terminal while the music is being played;
    performing the second work process based on the third user command, wherein performing the second work process incudes displaying a short message service function user interface including an option to send a short message via the short message service function and an option to perform a short message creation process, wherein the second work process is performed concurrently while the first work process is performed such that the music continues to be played while a short message creation process is performed or while the short message is being sent;
    receiving a fourth user command while the short message service function is performed via the second work process;
    activating, based on the fourth user command, a pop-up menu function while concurrently implementing the short message service function;
    displaying a pop-up menu of a predetermined format in response to the activation, wherein the pop-up menu corresponds to the first work process and includes a plurality of user selectable options for controlling playing of the music including an option to pause playing of the music;
    receiving a fifth user command while the pop-up menu is being displayed and the music is being played;
    deactivating display of the pop-up menu and displaying the short message service function user interface based on the fifth user command, wherein the music continues to be played even after display of the pop-up menu is deactivated and the mobile terminal concurrently performs the short message service function and audio player function after deactivation of the display of the pop-up menu;
    receiving a sixth user command while performing the second work process of implementing the short message service function;
    changing from the second work process to the third work process of implementing the camera mode function based on the sixth user command;
    recognizing a motion of the mobile terminal; and
    performing one or more work processes in the mobile terminal based on recognition of the motion.

2. The method of claim 1, further comprising:
    receiving a control signal from a processor; and
    performing an internet connection function work process in response to receiving the control signal.

3. The method of claim 1, wherein the sixth user command corresponds to selecting the third icon on the user interface of the mobile terminal.

4. The method of claim 1, further comprising implementing a voice recognition function to receive a command from the user based on a voice of the user.

5. The method of claim 1, wherein the first work process, the second work process, and the third work process are controlled based on a user's voice.

6. The method of claim 1, wherein third icon includes an image of a camera.

7. The method of claim 1, further comprising storing image information of the pop-up menu in a memory, wherein activating the pop-up menu includes retrieving the image information from the memory.

8. The method of claim 1, wherein performing the first work process includes temporarily storing in a temporary queue.

9. The method of claim 1, wherein displaying the pop-up menu includes displaying the pop-up menu and a screen corresponding to the short message service function such that the pop-up menu screen is displayed clearly and the short message service function screen is displayed unclearly as compared to the display of the pop-up menu.

10. A multitasking mobile terminal that concurrently performs a first work process and a second work process, comprising:
a camera implementing a camera function;
a display displaying a plurality of icons of a predetermined uniform size, the plurality of icons including:
a first icon corresponding to the first work process, wherein the first icon displayed in response to a first user command;
a second icon corresponding to the second work process; and
a third icon corresponding to a third work process,
wherein the first work process corresponds to an audio player function, the second work process corresponds to a short message service function, and the third work process corresponds to a camera mode function;
a memory for storing instructions; and
a multiprocessor executing the instructions to control the multitasking mobile terminal to:
receive a second user command selecting the first icon on the user interface of the mobile terminal;
perform the first work process based on the second user command, wherein performing the first work process incudes playing music using the audio player function and displaying an audio player user interface having a name of the music being played and a plurality of user selectable options for controlling playing of the music;
receive a third user command selecting the second icon on the user interface of the mobile terminal while the music is being played;
perform the second work process based on the third user command, wherein performing the second work process incudes displaying a short message service function user interface including an option to send a short message via the short message service function and an option to perform a short message creation process, wherein the second work process is performed concurrently while the first work process is performed such that the music continues to be played while a short message creation process is performed or while the short message is being sent;
receive a fourth user command while the short message service function is performed via the second work process;
activate, based on the fourth user command, a pop-up menu function while concurrently implementing the short message service function;
display, on the display, a pop-up menu of a predetermined format in response to the activation, wherein the pop-up menu corresponds to the first work process and includes a plurality of user selectable options for controlling playing of the music including an option to pause playing of the music;
receive a fifth user command while the pop-up menu is being displayed and the music is being played;
deactivate display of the pop-up menu and displaying the short message service function user interface based on the fifth user command, wherein the music continues to be played even after display of the pop-up menu is deactivated and the mobile terminal concurrently performs the short message service function and audio player function after deactivation of the display of the pop-up menu;
receive a sixth user command while performing the second work process of implementing the short message service function;
change from the second work process to the third work process of implementing the camera mode function based on the sixth user command;
recognize a motion of the mobile terminal; and
perform one or more work processes in the mobile terminal based on recognition of the motion.

11. The multitasking mobile terminal of claim 10, further comprising a motion recognition unit for recognizing the motion of the mobile terminal.

12. The multitasking mobile terminal of claim 10, further comprising a voice recognition unit for implementing a voice recognition function to receive a command from a user based on a voice of the user.

13. The multitasking mobile terminal of claim 10, wherein the multiprocessor further executes the instructions to perform an internet connection function work process in response to a control signal.

14. The multitasking mobile terminal of claim 10, further comprising a key, wherein the first work process is controlled based on input received by a key of the mobile terminal.

15. The multitasking mobile terminal of claim 10, wherein the first work process, the second work process, and the third work process are controlled based on a user's voice.

16. The multitasking mobile terminal of claim 10, wherein third icon includes an image of a camera.

17. The multitasking mobile terminal of claim 10, wherein the memory stores image information of the pop-up menu and activating the pop-up menu includes retrieving the image information from the memory.

18. The multitasking mobile terminal of claim 10, wherein displaying the pop-up menu includes displaying the pop-up menu and a screen corresponding to the short message service function such that the pop-up menu screen is displayed clearly and the short message service function screen is displayed unclearly as compared to the display of the pop-up menu.

* * * * *